US006621951B1

(12) United States Patent
Zhao et al.

(10) Patent No.: US 6,621,951 B1
(45) Date of Patent: Sep. 16, 2003

(54) THIN FILM STRUCTURES IN DEVICES WITH A FIBER ON A SUBSTRATE

(75) Inventors: Shulai Zhao, Encinitas, CA (US); Bo Pi, Carlsbad, CA (US)

(73) Assignee: Oluma, Inc., Carlsbad, CA (US)

( * ) Notice: Subject to any disclaimer, the term of this patent is extended or adjusted under 35 U.S.C. 154(b) by 0 days.

(21) Appl. No.: 09/894,977

(22) Filed: Jun. 27, 2001

Related U.S. Application Data

(63) Continuation-in-part of application No. 09/796,373, filed on Feb. 27, 2001, now Pat. No. 6,516,114.
(60) Provisional application No. 60/217,572, filed on Jul. 12, 2000, provisional application No. 60/214,681, filed on Jun. 27, 2000, provisional application No. 60/214,686, filed on Jun. 27, 2000, and provisional application No. 60/214,590, filed on Jun. 27, 2000.

(51) Int. Cl.[7] .................................................. G02B 6/26
(52) U.S. Cl. ............................. 385/30; 385/15; 385/31; 385/32; 385/39; 385/65; 385/83
(58) Field of Search ......................... 385/15, 18, 30, 385/31, 32, 39, 50, 65, 83

(56) References Cited

U.S. PATENT DOCUMENTS

| 4,021,097 A | 5/1977 | McMahon |
| 4,136,929 A | 1/1979 | Suzaki |
| 4,259,016 A | 3/1981 | Schiffner |
| 4,301,543 A | 11/1981 | Palmer |
| 4,302,071 A | 11/1981 | Winzer |
| 4,307,933 A | 12/1981 | Palmer et al. |
| 4,315,666 A | 2/1982 | Hicks, Jr. |
| 4,378,539 A | 3/1983 | Swanson |
| 4,392,712 A | 7/1983 | Ozeki |
| 4,431,260 A | 2/1984 | Palmer |
| 4,479,701 A | * 10/1984 | Newton et al. ........... 350/96.16 |
| 4,493,528 A | 1/1985 | Shaw et al. |
| 4,536,058 A | 8/1985 | Shaw et al. |
| 4,556,279 A | 12/1985 | Shaw et al. |
| 4,560,234 A | * 12/1985 | Shaw et al. ............... 350/96.15 |
| 4,564,262 A | 1/1986 | Shaw |
| 4,601,541 A | 7/1986 | Shaw et al. |

(List continued on next page.)

FOREIGN PATENT DOCUMENTS

| DE | 28 12 346 A1 | 3/1978 |
| EP | 0178045 A1 | 4/1986 |
| FR | 2613844 A1 | 10/1988 |
| JP | 52-14430 A2 | 2/1977 |
| JP | 52-24539 | 2/1977 |
| JP | 53-91752 A2 | 8/1978 |
| JP | 54-4153 A2 | 1/1979 |
| JP | 54-8542 | 1/1979 |
| JP | 54-68651 | 1/1979 |
| JP | 54-101334 A2 | 8/1979 |
| JP | 54-118255 A2 | 9/1979 |
| JP | 56-85702 | 7/1981 |
| JP | 58-10701 | 1/1983 |
| JP | 60-131503 | 7/1985 |
| JP | 64-50003 | 2/1989 |
| JP | 1-130106 | 5/1989 |
| JP | 1-222205 | 9/1989 |
| JP | 1-255803 | 10/1989 |
| JP | 4-31801 | 2/1992 |
| WO | WO 87/03676 | 6/1987 |

OTHER PUBLICATIONS

McCallion et al., "Side–polished fiber provides functionality and transparency," (Abstract) Laser Focus World, vol. 34, No. 9, p. S19–20, S22, S24, Penn Well Publishing, Sep. 1998.

(List continued on next page.)

Primary Examiner—Akm Enayet Ullah
Assistant Examiner—Jennifer Doan
(74) Attorney, Agent, or Firm—Fish & Richardson P.C.

(57) ABSTRACT

Thin-film techniques in forming fiber devices that engage fibers to a substrate with different material properties. Structure buffering, diffusion bonding, and thickness monitoring may be achieved by such thin-film techniques.

16 Claims, 11 Drawing Sheets

U.S. PATENT DOCUMENTS

| | | | |
|---|---|---|---|
| 4,688,882 A | | 8/1987 | Failes |
| 4,721,352 A | * | 1/1988 | Sorin et al. ............... 350/96.15 |
| 4,723,827 A | * | 2/1988 | Shaw et al. ............... 350/96.15 |
| 4,778,237 A | * | 10/1988 | Sorin et al. ............... 350/96.15 |
| 4,784,453 A | * | 11/1988 | Shaw et al. ............... 350/96.16 |
| 4,828,350 A | | 5/1989 | Kim et al. |
| 4,842,358 A | * | 6/1989 | Hall ........................ 350/96.15 |
| 4,869,567 A | | 9/1989 | Millar et al. |
| 4,896,932 A | | 1/1990 | Cassidy |
| 4,900,118 A | | 2/1990 | Yanagawa et al. |
| 4,986,624 A | | 1/1991 | Sorin et al. |
| 4,991,922 A | | 2/1991 | Dahlgren |
| 5,029,961 A | | 7/1991 | Suzuki et al. |
| 5,042,896 A | | 8/1991 | Dahlgren |
| 5,100,219 A | | 3/1992 | Takahashi |
| 5,329,607 A | | 7/1994 | Kamikawa et al. |
| 5,444,723 A | | 8/1995 | Chandonnet et al. |
| 5,533,155 A | | 7/1996 | Barberio et al. |
| 5,586,205 A | | 12/1996 | Chen et al. |
| 5,623,567 A | | 4/1997 | Barberio et al. |
| 5,651,085 A | | 7/1997 | Chia |
| 5,729,641 A | | 3/1998 | Chandonnet et al. |
| 5,781,675 A | | 7/1998 | Tseng et al. |
| 5,809,188 A | | 9/1998 | Tseng et al. |
| 5,841,926 A | | 11/1998 | Takeuchi et al. |
| 5,854,864 A | | 12/1998 | Knoesen et al. |
| 5,892,857 A | | 4/1999 | McCallion |
| 5,900,983 A | | 5/1999 | Ford et al. |
| 5,903,685 A | | 5/1999 | Jones et al. |
| 5,915,063 A | | 6/1999 | Colbourne et al. |
| 5,940,556 A | | 8/1999 | Moslehi et al. |
| 5,963,291 A | | 10/1999 | Wu et al. |
| 5,966,493 A | | 10/1999 | Wagoner et al. |
| 5,970,201 A | | 10/1999 | Anthony et al. |
| 6,011,881 A | | 1/2000 | Moslehi et al. |
| 6,026,205 A | | 2/2000 | McCallion et al. |
| 6,038,359 A | | 3/2000 | Moslehi et al. |
| 6,052,220 A | | 4/2000 | Lawrence et al. |
| 6,058,226 A | | 5/2000 | Starodubov |
| 6,130,984 A | | 10/2000 | Shen et al. |
| 6,134,360 A | | 10/2000 | Cheng et al. |
| 6,144,793 A | | 11/2000 | Matsumoto et al. |
| 6,185,358 B1 | | 2/2001 | Park |

OTHER PUBLICATIONS

Das et al., "Automatic determination of the remaining cladding thickness of a single–mode fiber half–coupler," (Abstract) Optics Letters, vol. 19, No. 6, p. 384–6, Mar. 15, 1994.

Ishikawa et al., "A new optical attenuator using the thermal diffusion of W–cladding fiber," (Abstract) MOC/GRIN '97 Technical Digest of the 6$^{th}$ Microoptics Conf./14$^{th}$ Topical Meeting on Gradient–Index Optical Systems in Tokyo, Japan, p. (vii+432+27), 208–11, Oct. 1997.

Matejec et al., "Optical fiber with novel geometry for evanescent–wave sensing," (Abstract) Sensors and Actuators B, (Chemical), vol. B29, No. 1–3, p. 416–22, Elsevier Publishing, Oct. 1995.

Alonso et al., "Single–mode, optical–fiber sensors and tunable wavelength filters based on the resonant excitation of metal–clad modes," (Abstract) Applied Optics, vol. 33, No. 22, p. 5197–201, Aug. 1, 1994.

Tomita et al., "Leaky–mode loss of the second propagating mode in single–mode fibres with index well profiles," (Abstract) Applied Optics, vol. 24, No. 11, p. 1704–7, Jun. 1, 1995.

Leminger et al., "Determination of the variable core–to–surface spacing of single–mode fiber–coupler blocks," (Abstract) Optics Letters, vol. 12, No. 3, p. 211–13, Mar., 1987.

Morshnev et al., "A fiber thermo–optical attenuator," (Abstract) Source: Radiotekhnika i Elektronika, Translated in: Soviet Journal of Communications Technology & Electronics, vol. 30, No. 9, p. 148–50, Sep., 1985.

Takahashi Mitsuo, "Variable light attenuator of improved air–gap type with extremely low returning light," (Abstract) Conf. Record—IEEE Instrumentation and Measurement Tech. Conf. 2, p. 947–950, 1994.

Schmidt et al., "New design approach for a programmable optical attenuator," (Abstract) Hewlett–Packard Journal, v. 46, n. 1, p. 34–39, 1995.

Hayata et al., "Algebraically decaying modes of dielectric planar waveguides," Optics Letters, vol. 20, No. 10, p. 1131–32, May 15, 1995.

Vengsarkar et al., "Photoinduced refractive–index changes in two–mode, elliptical–core fibers: sensing applications," Optics Letters, vol. 16, No. 19, p. 1541–43, Oct. 1, 1991.

Pantchev et al., "Method of Refractive Index Profile Reconstruction from Effective Index of Planar Optical Monomode Waveguides: Application to Potassium Ion–Exchanged Waveguides," IEEE Journal of Quantum Electronics, vol. 29, No. 1, p. 154–60, Jan. 1993.

Ikeda et al., "Analysis of the Attenuation Ratio of MQW Optical Intensity Modulator for 1.55 $\mu$m Wavelength Taking Account of Electron Wave Function Leakage," IEEE Journal of Quantum Electronics, vol. 32, No. 2, p. 284–92, Feb. 1996.

S. Masuda, "Variable attenuator for use in single–mode fiber transmission systems," Applied Optics, vol. 19, No. 14, p. 2435–38, Jul. 15, 1980.

Huang et al., "Field–Induced Waveguides and Their Application to Modulators," IEEE Journal of Quantum Electronics, vol. 29, No. 4, p. 1131–1143, Apr. 1993.

Iztkovich et al., "In–Situ Investigation of Coupling Between a Fibre and a Slab Waveguide," Tel Aviv University, Israel, May 29, 1990.

Brierley et al., "Amplitude and phase characterization of polished directional half–couplers with variable refractive index overlays," Optical Engineering, vol. 27, No. 1, p. 45–49, Jan. 1988.

Scholl et al., "In–line fiber optical attenuator and powermeter," SPIE vol. 1792 Components for Fiber Optic Applications VII, p. 65–70, 1992.

Tsujimoto et al., "Fabrication of Low–Loss 3 dB Couplers With Multimode Optical Fibres," Electronics Letters, vol. 14, No. 5, Mar. 2, 1978.

* cited by examiner

THIN FILM STRUCTURES IN DEVICES WITH A FIBER ON A SUBSTRATE

This application is a continuation-in-part of U.S. application Ser. No. 09/796,373 entitled "INTEGRATION OF FIBERS ON SUBSTRATES FABRICATED WITH GROOVES" and filed on Feb. 27, 2001, now U.S. Pat. No. 6,516,114. This application further claims the benefits of U.S. Provisional Application Nos. 60/214,681 entitled "MULTI-PURPOSE THIN FILM TECHNIQUE FOR FIBER OPTIC DEVICE FABRICATION" and filed on Jun. 27, 2000, 60/214,686 entitled "WAFER SCALE FIBER OPTIC DEVICE FABRICATION TECHNIQUE FOR MASS PRODUCTION" and filed on Jun. 27, 2000, 60/214,590 entitled "AN ENVIRONMENTALLY STABILIZED AND HIGH PRECISION INTEGRATED FIBER ARRAY ALIGNMENT TECHNIQUE" and filed on Jun. 27, 2000, and 60/217,572 entitled "IN-SITU MONITORING TECHNIQUE OF FIBER POLISHING" and filed on Jul. 12, 2000.

BACKGROUND

This application relates to optical fibers and fiber devices with one or more fibers engaged on substrates.

Optical fibers can be used to transmit or process light in a variety of applications, including, among others, delivering light to or receiving light from integrated optical components or devices formed on substrates, transmitting information channels in wavelength-division multiplexed optical communication devices and systems, forming fiber optic switch matrix devices or fiber array to array connector, producing optical gain for optical amplification or laser oscillation, and modulating guided light. One of the features of the optical fibers in those and other different applications is that an optical fiber operates as "a light pipe" to transport optical energy. A typical fiber may be simplified as a fiber core and a cladding layer surrounding the fiber core. The refractive index of the fiber core is higher than that of the fiber cladding to confine the light. Light rays that are coupled into the fiber. core within a maximum angle with respect to the axis of the fiber core are totally reflected at the interface of the fiber core and the cladding. This total internal reflection provides a mechanism to spatially confine the optical energy of the light rays in one or more selected fiber modes to guide the optical energy along the fiber core.

The guided optical energy in the fiber, however, is not completely confined within the core of the fiber or waveguide. A portion of the optical energy can "leak" through the interface between the fiber core and the cladding via an evanescent field that essentially decays exponentially with the distance from the core-cladding interface. The distance for evanescent decay in the electric field of the guided light by a factor of 2.718 is about one wavelength of the guided optical energy. This evanescent leakage may be used to couple optical energy into or out of the fiber core, or alternatively, to perturb the guided optical energy in the fiber core.

SUMMARY

The present disclosure includes structures that integrate one or more fibers to a substrate by, e.g., bonding the fiber to the substrate. In general, the material properties of the substrate may be different from those of the fiber material, e.g., the coefficient of thermal expansion. Hence, when the fiber is directly engaged to the substrate, the fiber and the substrate respond differently to environmental changes such as temperature and other factors such as aging. As a result, such fiber structure may be relatively unstable.

The devices and techniques of the present disclosure include one or more thin-film buffer layers positioned between the fiber and the substrate to provide a transition structure whose certain material properties such as the coefficient of thermal expansion have values between those of the fiber and those of the substrate. Hence, the overall stress due to the material mismatch in the buffered device is reduced compared to the stress in the non-buffered device where the fiber is directly engaged to the substrate.

The material of the buffer layer may also be selected to allow for diffusion between the buffer layer and the fiber at their contact locations. Each contact location may be locally heated to promote diffusion so that a direct diffusion bond can be formed to bond the fiber to the buffer layer.

In addition, a thin film formed over the substrate surface may also be used as a thickness-monitoring element for monitoring removal of the fiber cladding of a fiber that is engaged to an elongated groove on the substrate. In particular, this thin-film thickness-monitoring element can operate in sito to provide real-time information while the fiber cladding is being removed.

Embodiments of the invention include the following techniques.

In one embodiment, a method of this application includes the following operations:

forming an elongated groove over a substrate surface of a substrate;

forming a monitoring layer over at least said substrate surface adjacent to said elongated groove;

placing a fiber in said elongated groove to protrude a portion of fiber cladding above the initial surface of said monitoring layer;

bonding said fiber to said elongated groove;

removing said fiber cladding and said monitoring layer to be substantially coplanar with each other; and monitoring a thickness of said monitoring layer to determine whether a desired amount of fiber cladding is removed.

In the above method, the monitoring step may be performed during said removing step.

The above monitoring step may also be performed by measuring a reflected beam from reflecting an optical probe beam off said monitoring layer. This measurement of the reflected beam may be carried out in a number of ways, such as measuring interference in said reflected beam, measuring optical attenuation in said reflected beam by absorption of said monitoring layer, an ellipsometry measurement, and measuring a color shifting with respect to an incident angle of said probe beam.

The above method may also include:

forming a witness window in said monitoring layer to expose said substrate surface; and measuring a difference in height between a top surface of said monitoring layer and said substrate surface exposed in said witness window in monitoring said thickness of said monitoring layer.

In implementations, the monitoring layer may include a stack of two alternating films of different sheet resistance values and substantially identical thickness. With this film stack, the method may further include the following additional operations:

measuring a sheet resistance to identify which film is exposed; and determining said thickness of said monitoring layer by a number of films remaining over said substrate surface.

In another embodiment, a method of this application may include:

forming an elongated groove over a substrate surface of a substrate;

forming a buffer layer over surfaces of said elongated groove and at least the substrate surface adjacent to said elongated groove;

placing a fiber in said elongated groove to protrude a portion of fiber cladding above the initial surface of said buffer layer that is over said substrate surface;

bonding said fiber to said buffer layer in said elongated groove;

removing said fiber cladding and said buffer layer over said substrate surface to be substantially coplanar with each other; and monitoring a thickness of said buffer layer over said substrate surface to determine whether a desired amount of fiber cladding is removed, wherein a material of said buffer layer is different from said fiber and said substrate.

The monitoring step may be performed during said removing step and may be performed by measuring a reflected beam from reflecting an optical probe beam that illuminates said buffer layer over said substrate surface.

In one implementation, a material of said buffer layer is selected to permit material diffusion with said fiber, and wherein said bonding is achieved by locally heating a contact location between said fiber and said buffer layer in said elongated groove.

The bonding step may include a use of an adhesive to engage said fiber to said buffer layer in said elongated groove, or using CO2-assisted welding to engage said fiber to said buffer layer in said elongated groove. In yet another implementation, the bonding may be achieved by the following additional steps:

applying a liquid gel between said fiber and said buffer layer in said elongated groove; and heating up said liquid gel to a solidified state to bond said fiber to said buffer layer in said elongated groove.

The material of said buffer layer may be selected to have a material parameter with a value that is between a first value of said material parameter for said substrate and a second value of said material parameter for said fiber. This material parameter may be a coefficient of thermal expansion. Furthermore, the buffer layer is a liquid gel which solidifies when heated to a temperature, and the bonding in this situation includes heating up said butter layer to said temperature.

DETAILED DESCRIPTION

The devices and techniques of this application include one or more thin films formed over the substrate fabricated with one or more grooves to which a fiber is integrated on or engaged. In one embodiment, the film is located at least between the fiber and the substrate to operate as a buffer therebetween to stabilize the structure. A material property of this buffer film has a value between values of that material property of the substrate and the fiber material. The buffer layer may also be selected to allow for diffusion between the buffer layer and the fiber at their contact locations. Each, contact location may be locally heated to promote diffusion so that a direct diffusion bond can be formed to bond the fiber to the buffer layer. In another embodiment, the film is located at least on the substrate surface where the fiber is positioned in an elongated groove and is polished to remove a portion of the fiber cladding to form a fiber coupling port. The polished. fiber surface is substantially coplanar with the film surface so that the removing process removes both the fiber cladding and the film. Hence, the thickness of the film can be used to indicate the distance between the polished fiber surface and the fiber core.

In general, the fiber coupling port is formed by removing one portion of the cladding of the fiber and polishing the surface of the removed portion to form a fiber coupling port. The surface may be sufficiently close to the fiber core so that optical energy can be coupled via evanescent fields out of or into the fiber core. The strength of the evanescent coupling is sensitive to the specific distance between the fiber core and the polished surface. Hence, it is desirable to control the amount of fiber cladding to be removed by monitoring the cladding removing operation.

The following sections first describe in detail the basic structures for engaging a fiber into an elongated groove in the substrate. Next, thin-film structures for buffering, bonding and thickness monitoring are described.

Figure 1:
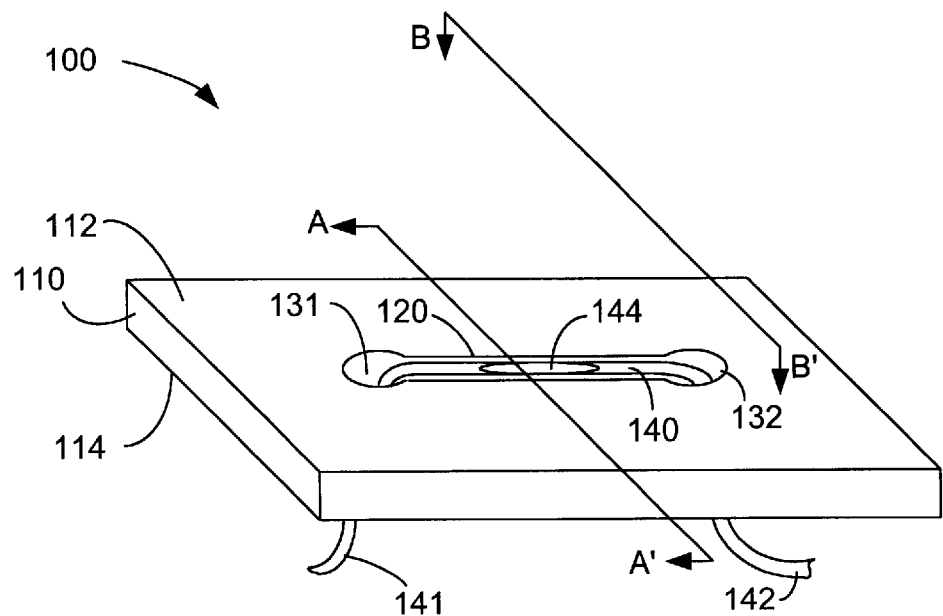
FIG. 1 shows one embodiment of a fiber device that integrates or engages a fiber to a substrate with an elongated groove for positioning the fiber and two openings at both sides of the groove for holding the fiber.
Figure 2A:
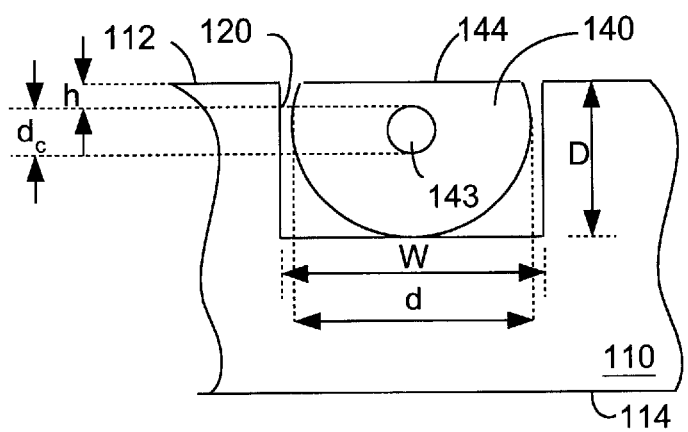
FIGS. 2A and 2B show a cross sectional view of the device in FIG. 1 along the direction AA' and a side view of the device in FIG. 1 along the direction BB', respectively.
Figure 2B:
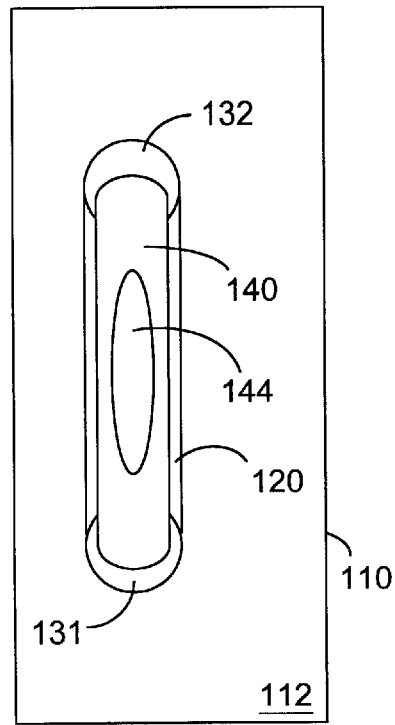

FIG. 1 shows one embodiment of a fiber device 100 where a fiber 140 is integrated or engaged to a substrate 110. The fiber device 100 may be used as a building block to construct a variety of fiber devices, including but not limited to, fiber couplers, fiber attenuators, fiber modulators, fiber beam splitters, optical fiber switches, and fiber frequency-division multiplexers. FIGS. 2A and 2B show additional details of the fiber device 100.

The substrate 110 may be formed of various materials, such as crystalline materials such as semiconductors (Si, GaAs, etc) or any other solid-state materials that can be processed to form the device features such as grooves and through holes disclosed herein. Two parallel and opposing substrate surfaces, 112 and 114, are generally flat and may be polished. An elongated groove 120 is formed in the substrate 110 on the surface 112 and is essentially a recess from the surface 112. The groove 120 may be fabricated by removing a portion of the material from the substrate 110 through etching or other processes.

Figure 3A:
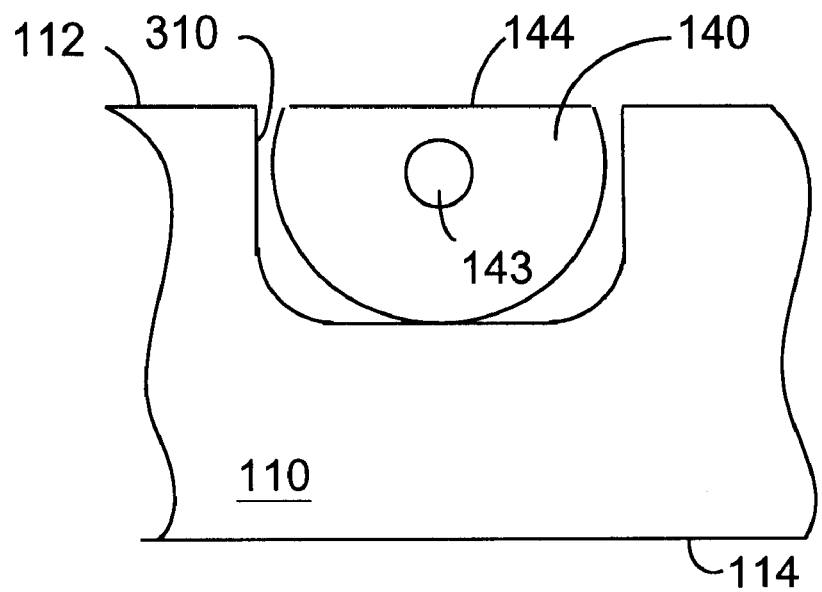
FIGS. 3A and 3B show examples of two different cross sections for grooves shown in FIG. 1.
Figure 3B:
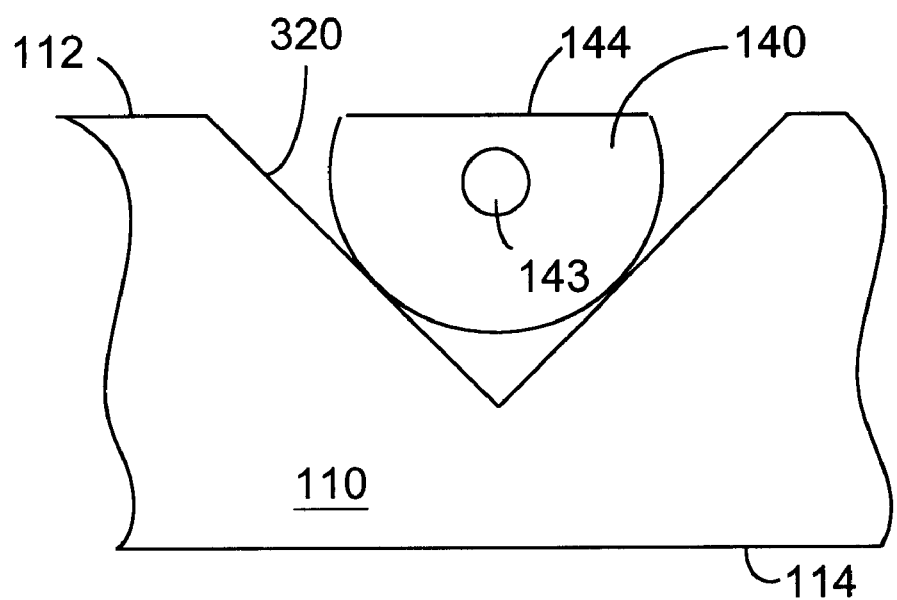

The geometry of the groove 120 is generally elongated along a straight line as illustrated or along a curved line. Unless otherwise indicated, the following description will use straight-line grooves as examples. Some embodiments are described with specific reference to groove with V-shaped cross sections as shown by the groove 310 in FIG. 3B. The cross sections are generally not so limited and may also be other shapes as well, including rectangular as shown in FIG. 2A, U-shaped as shown by the groove 310 in FIG. 3A, a circularly shape or other suitable shapes.

The width, W of the groove 120 is generally greater than the diameter, d, of the fiber 140 and may either remain a constant or vary spatially along the groove 120, e.g., increasing from the center towards the two ends. The length, L, of the groove 120 may vary from one grove to another and can be determined based on specific requirements of applications. The depth D of the groove 120 may be a constant or may vary along the groove 120, e.g., increasing from the center towards the two ends. In general, at least a portion of the groove 120 has a depth D less than the fiber diameter d (but greater than the sum of the fiber radius r=d/2 and radius of the fiber core $r_c=d_c/2$. This portion of the groove 120 exposes partial fiber cladding of the fiber 140 above the surface 112 while still keeping the fiber core below the surface 112. Alternatively, the depth D of the groove 120 may also be selected to expose the fiber core. Other portions of the groove 120 may have a different depth so that the fiber can be placed within the groove 120 under the substrate surface 112. Depending on the geometry of the groove 120 (e.g., the apex angle of a V-shaped groove), the depth D of the entire groove 120 may be greater than fiber diameter d. For example, the central portion of the groove 120 may have a depth D less than d while the portions on either sides of the central portion may have a depth equal to or greater than the fiber diameter d.

Notably, the fiber device 100 includes two openings 131 and 132 that are respectively formed at the two ends of the groove 120 and penetrate through the substrate 110. Hence, the openings 131 and 132 are through holes extending between the two surfaces 112 and provide access from one surface (112 or 114) to another. The spacing between the openings 131 and 132 essentially determines the length L of the groove 120. The aperture of the openings 131 and 132 should be sufficiently large to receive the fiber 140, e.g., with a diameter greater than the diameter of the fiber 140. The shape of the holes 131 and 132 may generally be in any suitable geometry.

A portion of the fiber 140 is placed in the groove 120 near the surface 112. The remaining portions 141, 142 of the fiber 140 on both sides of the portion in the groove 120 are respectively fed through the first and second openings 131, 132 to the other side 114 of the substrate 110. After being placed in the substrate 110 as shown in FIG. 1, the fiber 140 may be slightly pulled by moving the fiber portions 141 and 142 in opposite directions so that the portion of the fiber 140 in the groove 120 is in substantially full contact with the groove 120.

Since a portion of the groove 120 has a depth D less than the fiber diameter d, the cladding of the fiber 140 in this portion protrudes out of the surface 112. The fiber core in this portion of the fiber is generally kept under the surface 112. For example, the cladding of a central portion of the fiber 140 between the holes 131 and 132 may be exposed. This protruded or exposed cladding is then removed and polished to form a flat surface 144 of a length $L_c$ that is above the fiber core 143 and is substantially coplanar with the surface 112 of the substrate 110. When the spacing, h, between the flat surface 144 and the fiber core 142 is sufficiently small (e.g., on the order of or less than one wavelength of optical energy), the flat surface 144 can be used to couple optical energy into or out of the fiber core 144 through the evanescent fields outside the fiber core. Hence, the length, Lc, of the flat surface 144 approximately represents the optical coupling length for the fiber device 100.

FIGS. 1 and 2A show the use of elongated groove 120 and two through holes 131 and 132 at ends of the groove 120 to engage a fiber to the substrate 110 and to form the fiber coupling port 144. Alternatively, only one through hole 132 in the substrate 110 may be needed to engage the fiber 140 to form the fiber module for coupling with a waveguide module. As shown in the design 400 in FIG. 4, the groove 120 may extend to one end side 410 of the substrate 110 so that one end 141 of the fiber 140 leaves the groove 120 without going through a through hole. In addition, FIG. 5 shows a conventional design 500 in which the groove 120 may extend to two opposing end sides 410 and 510 of the substrate 110 so that the fiber 140 is engaged to the groove 120 without relying on any through holes. When a substrate is used to support multiple fibers, the above different techniques may be used on the single substrate.

In the above fiber devices, the fiber materials are generally different from substrate materials because the substrate materials may be crystalline materials suitable for being etched to form V-grooves and fiber materials may be glasses such as fused silica glasses. Under this condition, the thermal, mechanical, aging, and other characteristics of a fiber and the substrate to which the fiber is engaged are generally different. It may be desirable to use semiconductor silicon, GaAs, or other crystalline materials to form the substrate 110 because V-shaped grooves at predefined fiber positions may be formed on the surface 112 by performing a photolithographic process with a specially-designed mask. Hence, the position and orientation of each fiber 120 can be precisely defined in the patterns of the mask. This technique is known to be reliable and precise. However, material parameters of many semiconductor materials are different from those of the fused silica glass materials. For example, the coefficient of thermal expansion (CTE) of silicon substrate ($2.6 \times 10^{-6}/°$ C.) is about five times higher than that of an optic fiber made of fused silica glass ($\sim 0.5 \times 10^{-6}/°$ C.). Under the same environmental conditions, the responses from the fiber and the underlying substrate are different and thus may cause stresses at the interface of the fiber and the substrate.

Such stresses may change the position or orientation of the fiber, cause geometrical distortion in the fiber, and even damage the fiber when the stresses are above a threshold level. Consequently, the material mismatch may adversely affect the alignment of the fiber to a waveguide, a lens, or other optical component in the system, the overall efficiency of the optical coupling into or out of the fiber, and may even cause catastrophic bonding failure. In absence of device failure, the material mismatch may also cause the fiber alignment and coupling efficiency to vary with environmental conditions.

Figure 5:
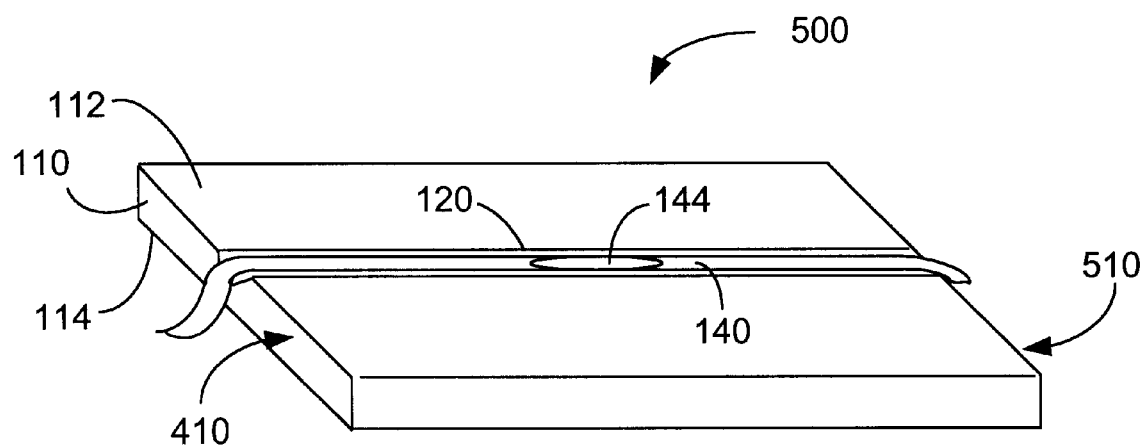
FIG. 5 shows yet another embodiment of a fiber device that integrates or engages a fiber to a substrate with an elongated groove for positioning the fiber holding the fiber without any openings penetrating the substrate.
Figure 6:
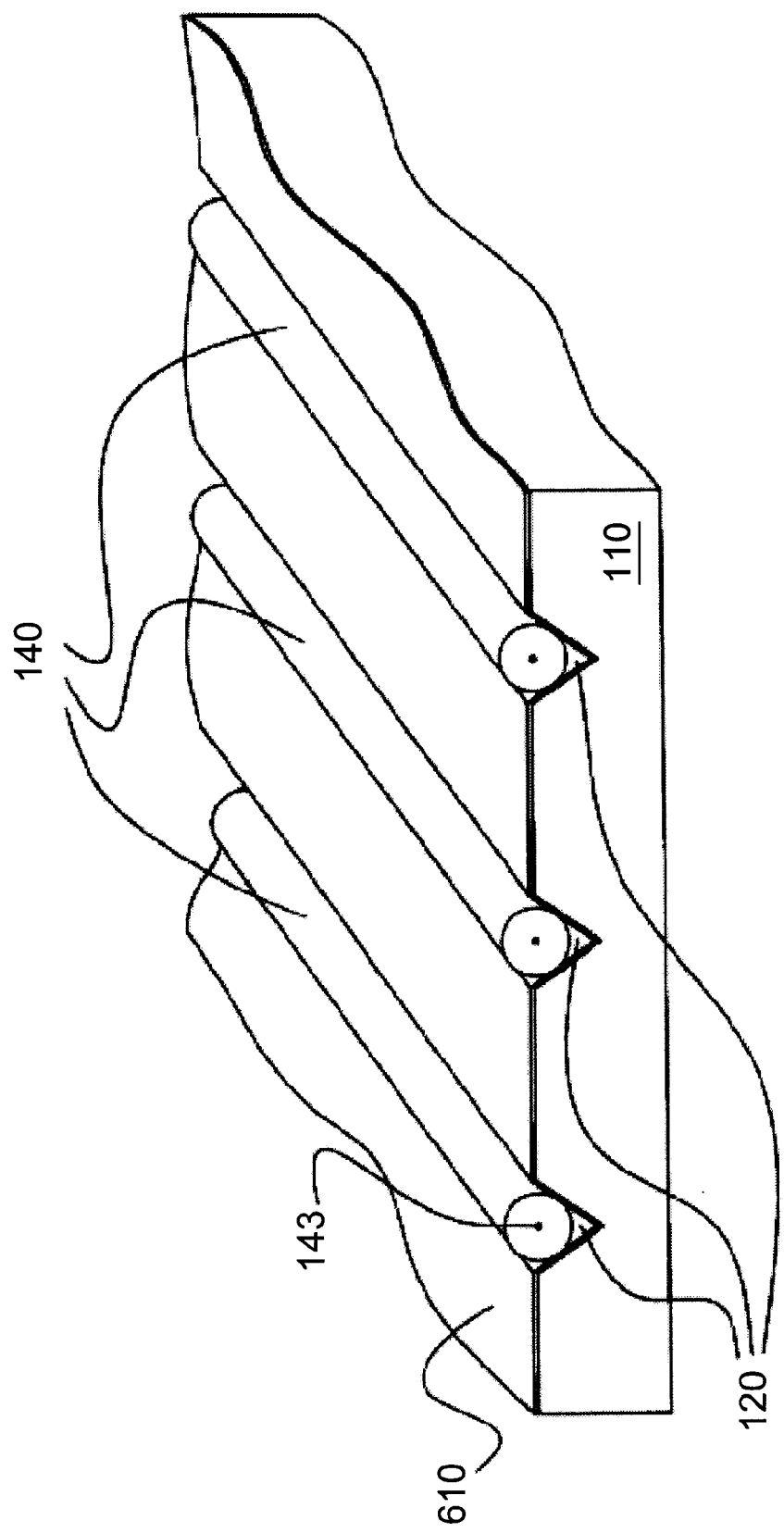
FIG. 6 shows a fiber device that has a thin film of a suitable material formed over a groove over a substrate under the fiber 140 as one buffer layer.

FIG. 6 shows a thin film 610 of a suitable material formed over a groove 120 under the fiber 140 as, one buffer layer. This buffer layer structure may also be implemented in the fiber devices shown in FIGS. 1, 4, and 5 or other fiber devices based such or similar structures. The buffer layer 610 may be designed to have certain mechanical or thermal properties to stabilize the structure formed by the substrate 110, the buffer layer 610, and the fiber 140 by reducing the mechanical or thermal stress between the substrate 110 and the glass fiber 140. Therefore, the reliability of the device can be improved. For example, if the substrate 110 is formed of silicon, a dielectric material with a coefficient of thermal expansion (CTE) between the CTE values of the silicon and the glass fiber may be used as the buffer 610. Two or more buffer layers may also be used to achieve desired stabilizing effects.

For many commercial fibers, the fiber material is mainly a fused silica glass. Hence, a dielectric material like silicon dioxide or silicon nitride ($Si_xN_y$) may be used to form the buffer layer. The silicon dioxide buffer layer may be advantageous when the fiber 120 is bond by using glass frit thermal fuse. The silicon oxide can provide better adhesion of fiber attachment. In addition, the silicon dioxide also has similar hardness to the fiber 120 so uniform polishing may be achieved when the fiber cladding is removed by the chemical mechanical polishing method.

The thickness of the buffer layer 610 in general may be approximately between 1 to 5 microns. It is known that the stress caused by the CTE mismatch is inversely proportional to the thickness of the buffer layer. L. F. Coffin, "Low cycle fatigue: a review," Appl. Mech. Research, Vol. 1(3), p.129–141 (1962). Hence, certain applications may require a thicker or thinner buffer layer 610 depending on their specific tolerance levels for stress.

Figure 4:
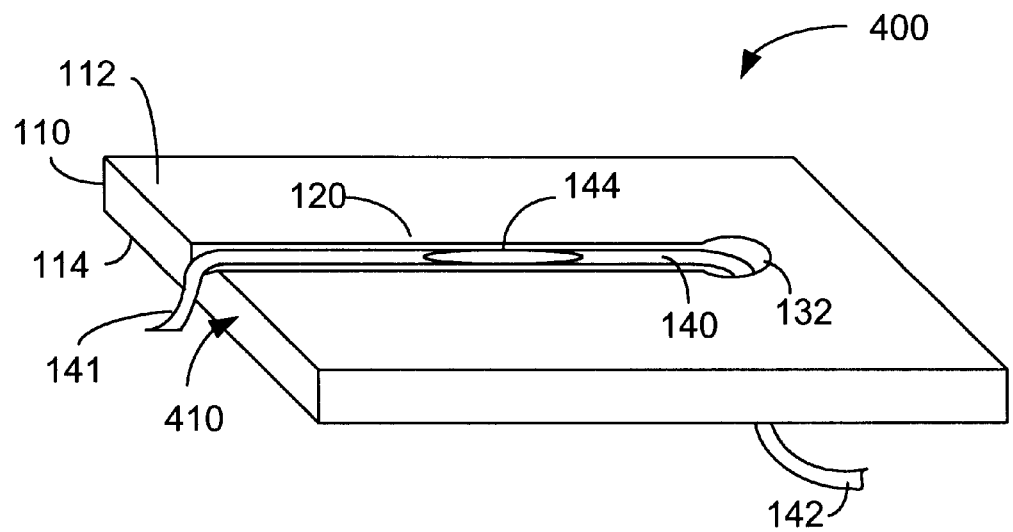
FIG. 4 shows another embodiment of a fiber device that integrates or engages a fiber to a substrate with an elongated groove for positioning the fiber and a single opening at one end of the groove for holding the fiber.
Figure 7A:
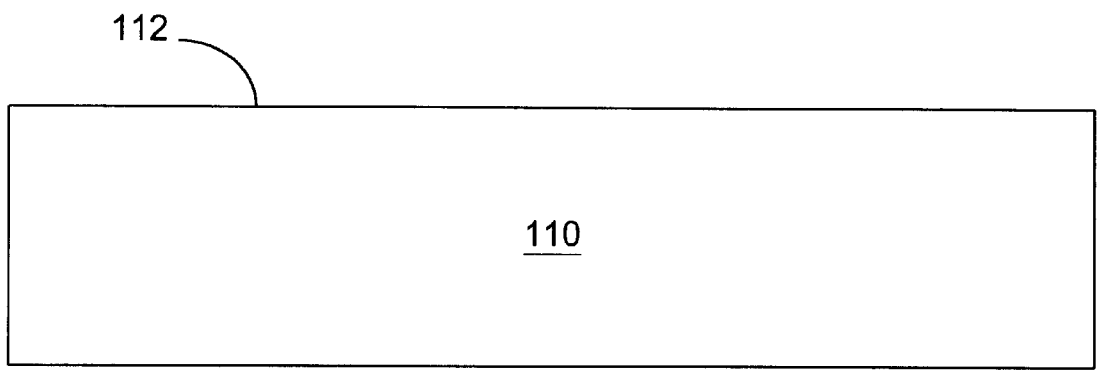
FIGS. 7A, 7B, 7C, 7D, 7E, and 7F show fabrication of the fiber device in FIG. 6.
Figure 7B:
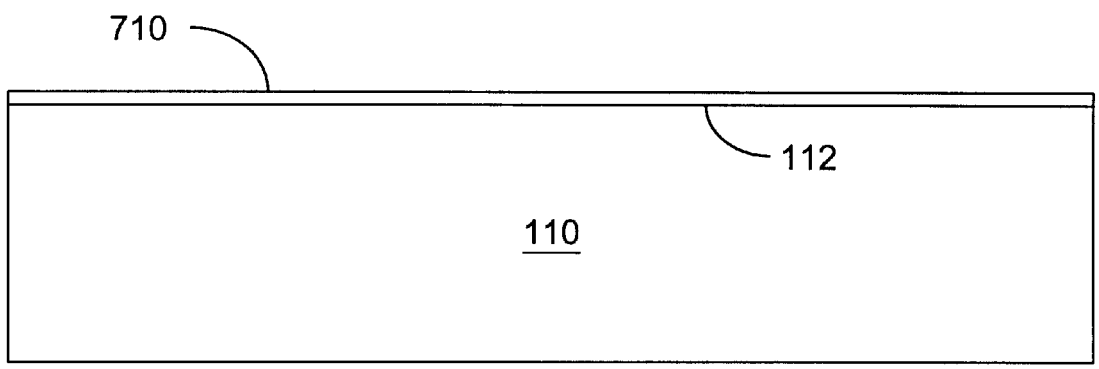
Figure 7C:
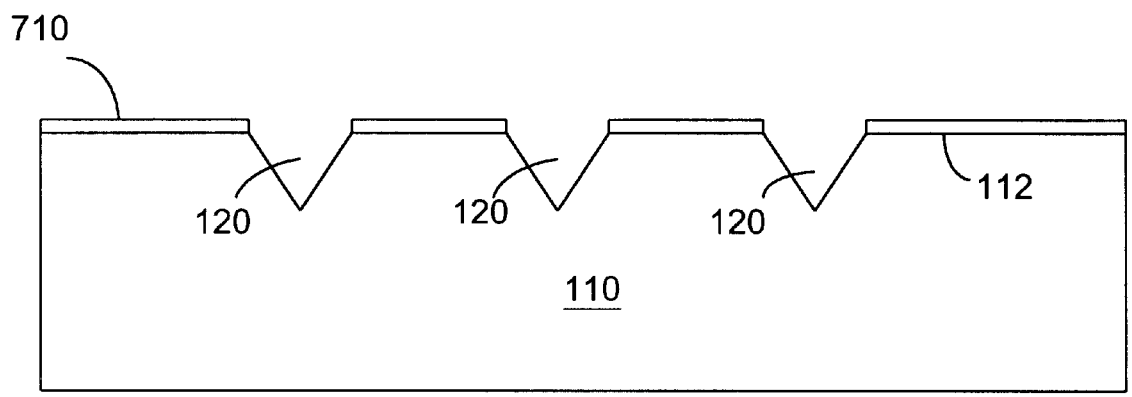
Figure 7D:
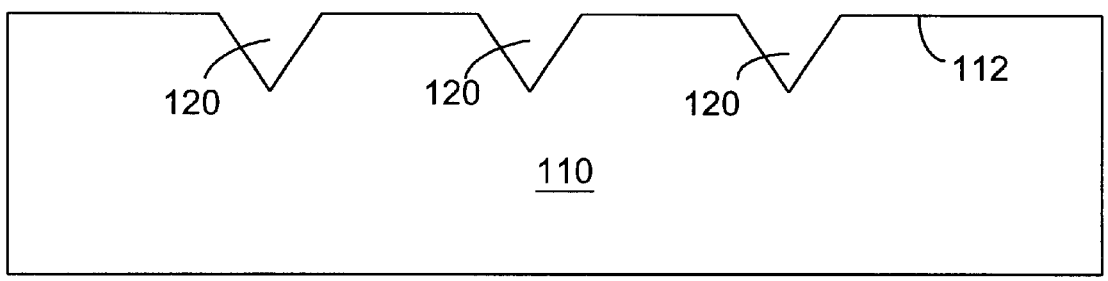
Figure 7E:
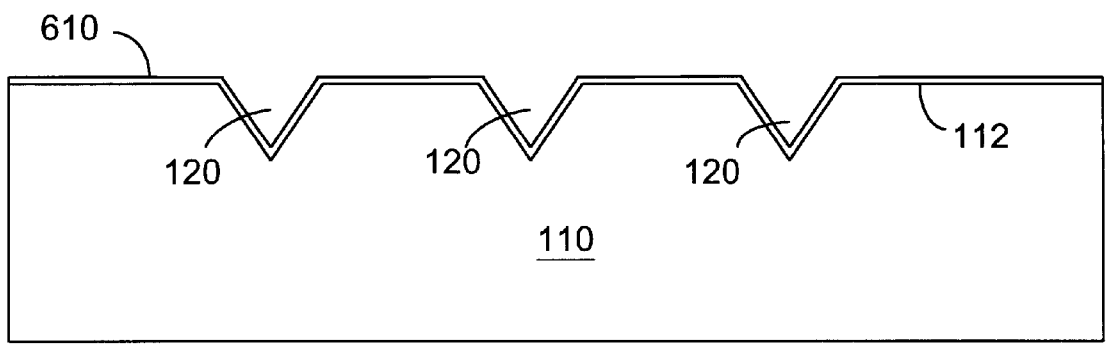

FIGS. 7A through 7F illustrate one exemplary process for fabricating a fiber device on a silicon substrate with a buffer layer 610 and a fiber coupling port as shown in FIGS. 1, 4, or 5. In FIG. 7A, a silicon substrate 110 has two opposing surfaces 112 and 114 and is prepared for fabrication. A thermal silicon oxide mask layer 710 is formed over the surface 112 (FIG. 7B). Next, a photolithographic process is performed to pattern the mask layer 710 for forming V grooves 120. An anisotropic etching is performed to form the V grooves 120 (FIG.7C) and the patterned mask layer 710 is removed by using, e.g., the buffered oxide etch in a HF-based chemical mixture (FIG.7D). The thin-film buffer layer 610 is then deposited over the V grooves 120 and the remaining, unetched substrate surface 112 by using a suitable method, such as physical vapor deposition (PVD), chemical vapor deposition (CVD), plasma-enhanced CVD, wet thermal oxidation process, or dip and immersion (FIG. 7E). In the step shown in FIG. 7F, the fibers 140 are laid the grooves 120 and are bonded to the substrate 110. This may be achieved by applying a proper adhesive or epoxy the contact area between the fiber 140 and the buffer layer 610 or using $CO_2$-assisted direct welding in which silica glass frit may be used to assist the welding process. In addition, silica sol-gel assisted welding may also be used, where a thin coat of a liquid material containing silica, e.g., a silica sol-gel which may be an organic polymer of silicate network, is coated on the fibers 140 and the buffer layer 610 over the substrate 110. Heat can be applied to the assembly to transform the liquid silica sol-gel into a solidified state at a certain temperature to form a solid glass that bonds the fibers 140 to the buffer layer 610. In addition, such silica sol-gel may be used to form the buffer layer 610 and hence the fibers 140 may be directly bonded to the buffer layer 610.

Upon curing of the bonding, the fibers 140 are then polished to remove a portion of fiber cladding and to form the fiber coupling ports 144.

Figure 7F:
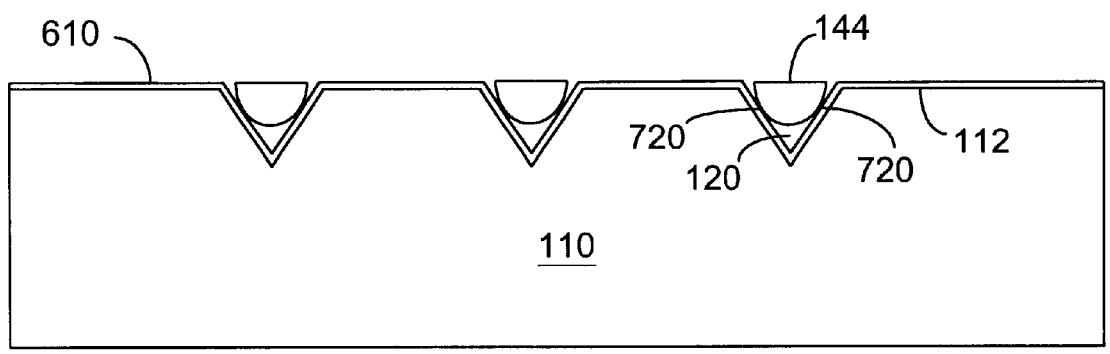

The bonding process in FIG. 7F may also be performed by a direct diffusion bonding process without using adhesive or welding process. More specifically, the material for the buffer layer 610 is selected to allow for material diffusion between the buffer layer 610 and the fiber 140 at their contact locations 720. The buffer layer surface and the surface of the fiber 140 can be treated by using a pre-bonding activation process, which may include cleaning of the contact surfaces for such bonding (e.g., polishing), a wet chemical activation process, a plasma activation process, or an ultra vacuum activation process. During the bonding process, each contact location 720 may be locally heated to promote the material diffusion so that a direct diffusion bond can be formed to bond the fiber 140 to the buffer layer 610. For example, a laser beam may be directed to each contact location 720 for local heating. For commercial fused silica fibers, the buffer layer 610 may be formed of a fused silica glass to use this diffusion bonding feature.

One important device.parameter in the fiber device in FIG. 7F is the distance between the fiber core and the polished surface 144 because this distance primarily determines the strength or efficiency of evanescent coupling of the coupling port 144. Referring back to FIG. 2A, this distance may be measured by either the spacing, h, between the surface 144 and the top side of the fiber core 143, or the spacing, $h+d_c/2$, between the surface 144 and the center of the fiber core 143. During the fabrication step for removing the fiber cladding, it is desirable to precisely control this distance to achieve desired and consistent coupling strengths. This control can be realized by monitoring and measuring the distance during the removing and polishing process. However, direct measurement of the distance between the surface 144 and the fiber core 143 is generally difficult.

The present disclosure provides a technique to indirectly measure the distance between the surface 144 and the fiber core 143. Specifically, the thickness of the portion of the thin-film buffer layer 610 located on the substrate surface 112 may be used to infer the distance between the fiber core 143 and the coupling surface 144 after the fiber cladding and the buffer layer 610 begin to be removed and polished at the same time. This indirect measurement is in part based on knowing several geometric parameters.

Figure 8:
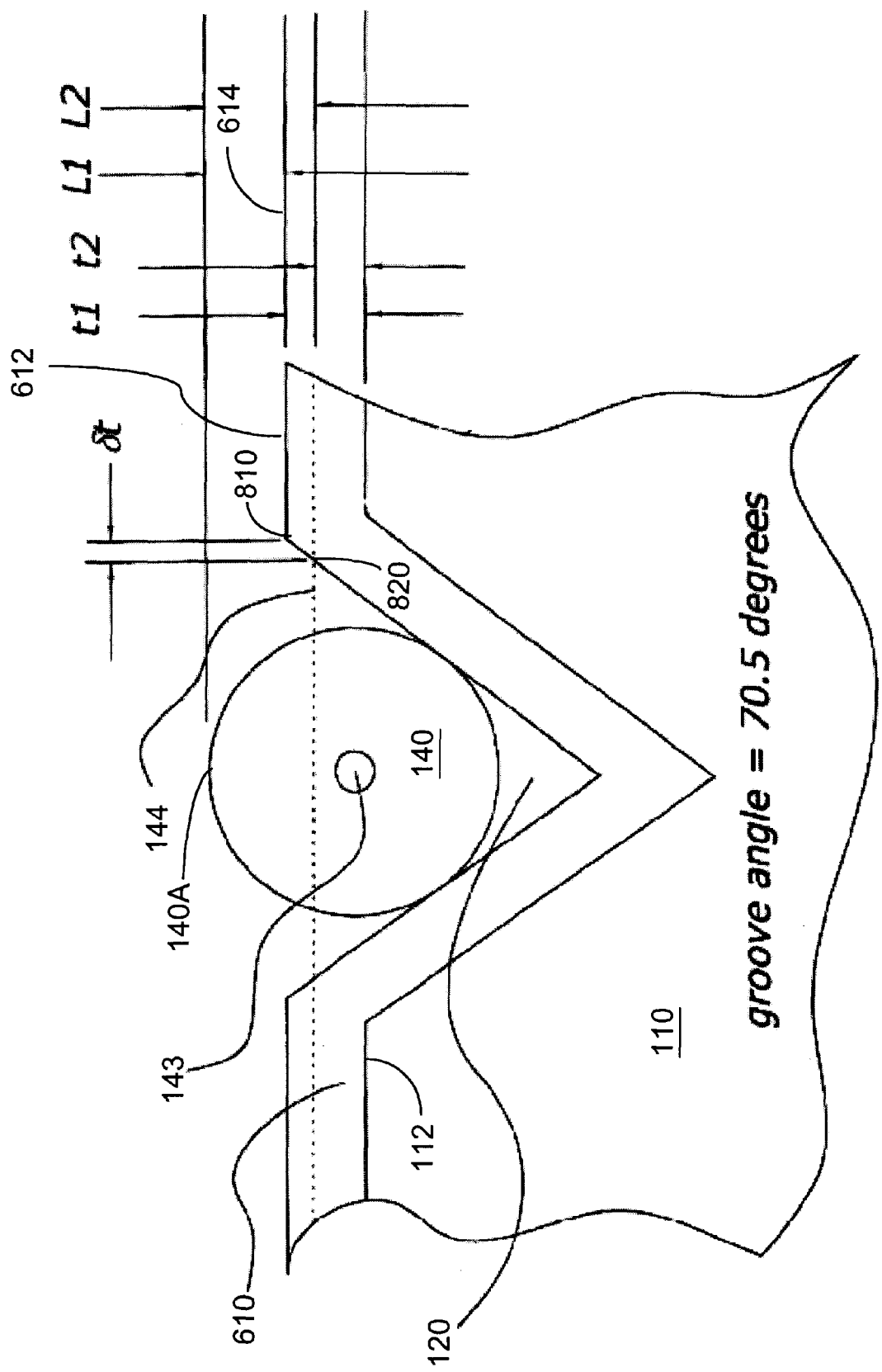
FIG. 8 illustrates thickness monitoring by using a film laid over the top surface of the substrate.

FIG. 8 illustrates the basic operation of this technique according to one embodiment where the buffer layer 610 fills both the groove 120 and the substrate surface 112. The top surface 612 of the thin-film buffer layer 610 over the substrate surface 112 is assumed to be initially above the desired final position of the surface 144 prior to removal of any fiber cladding. Assume the buffer film 610 has an initial thickness $t_1$, the initial top surface 140A of the fiber 140 is spaced from the initial top surface 612 by $L_1$ and from the final polished surface 614 by $L_2$. Note that the final polished surface 614 of the buffer layer 610 is substantially coplanar with the polished fiber surface 144. The final film thickness $t_2$ is related to $t_1$, $L_1$, and $L_2$ by the following relationship:

$$t_2 = t_1 L_2 + L_1.$$

For a given groove geometry, the position of the fiber core 143 relative to a reference point such as the substrate surface 112 is known. For example, in a V groove as illustrated in FIG. 8, the apex angle of the V groove (e.g., about 70.5 degrees in Si), the initial film thickness $t_1$, and the diameter of the fiber 140 allow determination of the height difference between the fiber core 143 and the to substrate surface 112. Therefore, the final film thickness $t_2$ measured from the polished film surface 614 to the substrate surface 112 can provide a measurement of the spacing between the final polished fiber surface 144 from the fiber core 143.

Figure 9:
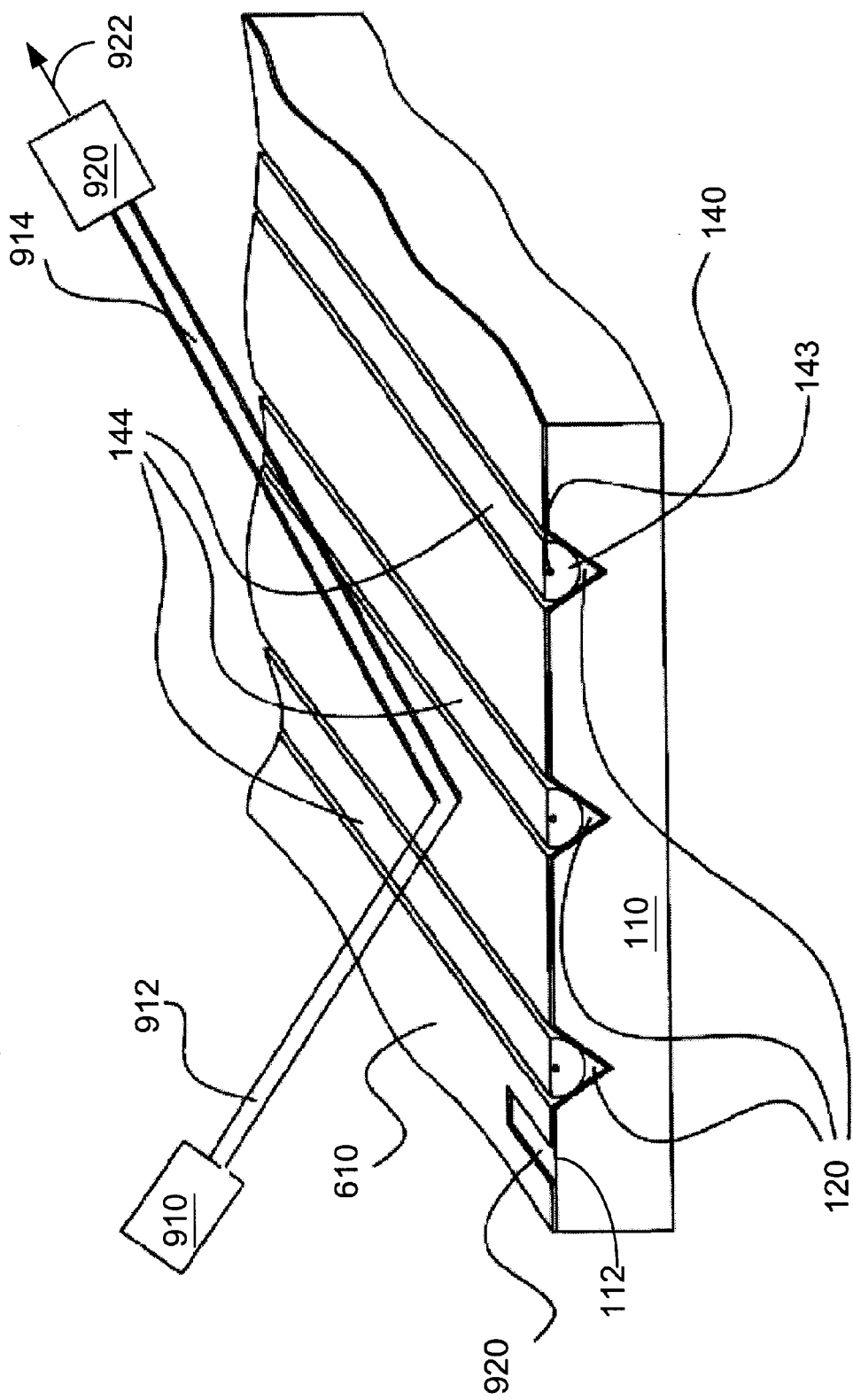
FIG. 9 illustrates an in-situ system for optically measuring the thickness of the film over the substrate for inferring spacing between the fiber surface and the fiber core.

A number of techniques may be applied here to determine the final film thickness $t_2$ of the buffer layer 610. FIG. 9 illustrates an optical technique to provide an in-situ monitoring of the film thickness so that the cladding removing process may be terminated as the final film thickness $t_2$ is reached. A probe laser 910 is provided to generate a coherent laser beam 912 at a suitable wavelength to which the buffer layer 610 is at least partially transparent. The probe beam 912 is reflected by the buffer layer 610 as a reflected probe beam 914. An optical detection unit 920 is positioned to receive the reflected probe beam 914 and to produce a detector signal 922. A signal processor receives the detector signal 922 and extracts the film thickness of the buffer layer 610. This measurement is then used to control the cladding removing process. Notably, the optical sensing provided by the optical system shown in FIG. 9 can be non-invasive and can be performed in real time while the removing process in progress, i.e., in-situ, when the polishing device is designed to accommodate the beam paths of the beams 912 and 914.

The above optical system may be configured and operated differently. In one configuration where a single monochromatic wavelength is present in the probe beam 912, the interference pattern at the top film surface due to multiple reflections between the two and bottom film surfaces may be measured. The incident angle of the probe beam 912 may be scanned over an angular range to detect the maximums and minimums of the interference to extract the film thickness. Another interference technique uses a tunable or broadband light source to produce the probe beam 912 so that interference maximums and minimums of different wavelengths may be measured for determining the film thickness.

In a second optical configuration, the optical system in FIG. 9 may be used to perform ellipsometry measurements to determine the film thickness. Ellipsometry is known and measures a change in the state of polarization of a reflected beam from the state of polarization of an incident beam caused by reflection or transmission of a sample material. This change in the state of polarization may be represented by two parameters, the amplitude and the phase of the complex reflectance ratio of the illuminated spot. When the reflective surface is a thin dielectric film formed over a substrate, two unknown parameters of the film and the substrate may be determined. For example, the two parameters in general may be any two of the refractive indices and absorption coefficients of the film and the substrate and the thickness of the substrate. In this application, the film thickness will be measured.

In a third optical configuration, the monotonic laser source 910 may be replaced by a wide-spectral light source so that the color shift in the reflected probe beam 914 may be measured with respect to the shifting angle of incidence of the probe beam 912. This color shifting information can then be used to determine the film thickness. For example, a fluorescent light source may be used for measuring the film thickness in a near normal incident configuration.

In yet a fourth optical configuration, when the absorption coefficient of the buffer layer 610 and its refractive indices of the buffer layer 610 and substrate 110 are known, the light attenuation of the probe beam 912 that passes through the buffer layer 612 for a number of times (e.g., twice in a double-pass measurement) may be used to determine the film thickness.

Alternatively, the lateral edge shift, $\delta t$, due to removal of the buffer layer 610 at one edge of a V-groove 120 may be measured and used to determine the film thickness:

$t_2 = \delta tx \tan(90\text{-one half of V-groove apex angle})$.

This technique is illustrated in part in FIG. 8 where the numeral 810 represents the initial edge position prior to any polishing and the numeral 820 represents a shifted edge position after the polishing that removes both the fiber cladding and the buffer layer 610.

Another alternative for measuring the film thickness of the buffer layer over the substrate surface 112 uses a surface profilometer such as the commercial Dektek profilometer based on a needle tip probe. Referring to FIG. 8, a witness window 920 may be formed in the buffer layer 610 in a portion over the substrate surface 112 to expose the substrate surface 112. The needle tip probe is placed in contact with the surface it measures and would change its position (height) when leaving the surface of the buffer layer 610 to enter the witness window 920 and vice versa. This change provides a mechanism for measuring the film thickness. This technique may be used to measure the initial film thickness prior to the polishing and the changing film thickness during the polishing.

Figure 10:
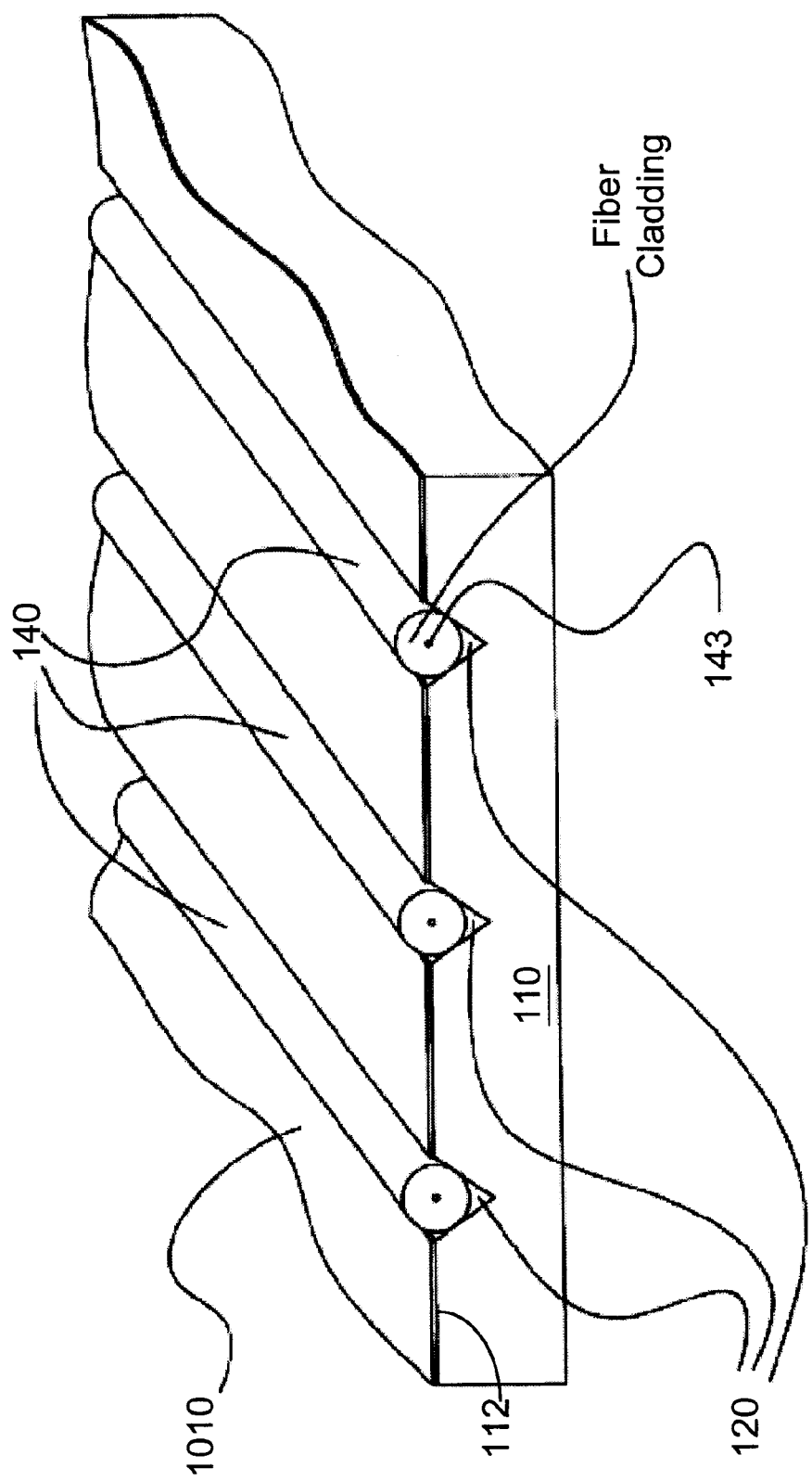
FIG. 10 illustrates a fiber device that has a thin-film monitoring layer formed for thickness monitoring as shown in FIGS. 8 and 9.
Figure 10A:
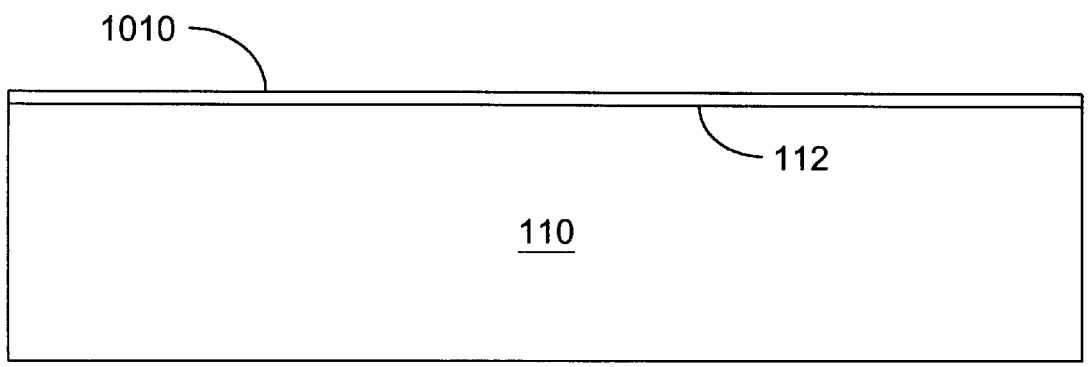
FIGS. 10A, 10B, and 10C show fabrication steps of the device in FIG. 10.
Figure 10B:
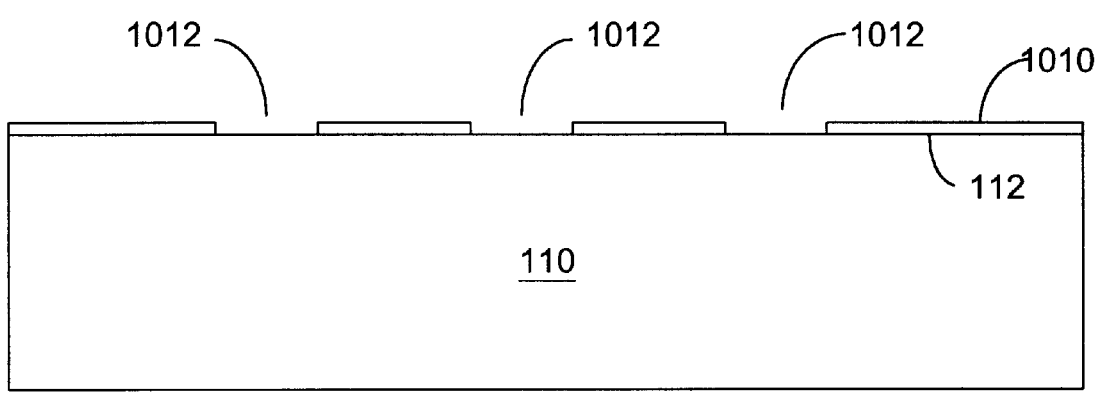
Figure 10C:
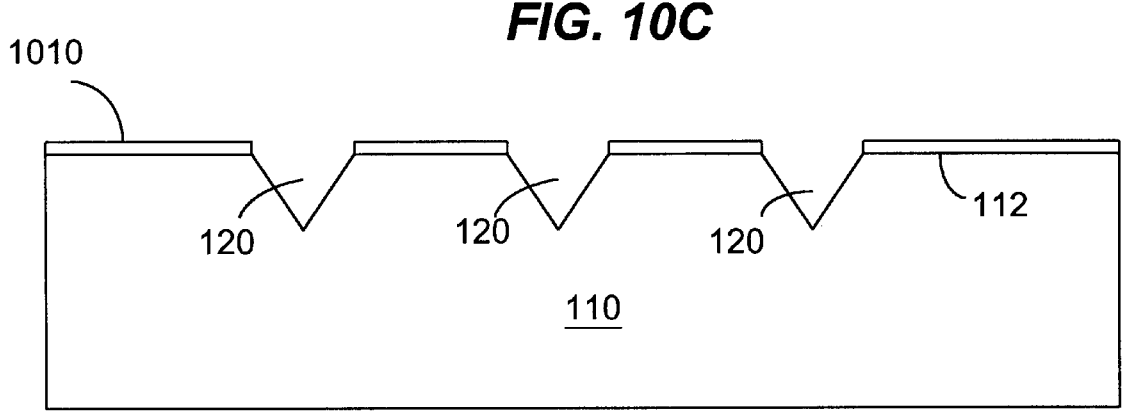

The above thickness monitoring by using a thin film. over the substrate surface 112 of the substrate 110 may be implemented by a thin film formed only on the substrate surface 112 for thickness monitoring. This thin film may be absent in the grooves 120 and may not be in contact with the fibers 140. FIG. 10 shows such a thin film 1010 as a monitoring layer over the substrate 110. The thickness monitoring operations are similar to the above associated with the buffer layer 610 for thickness monitoring. FIGS. 10A through 10C further illustrate the formation of the film 1010. Different from the growth process in FIGS. 7A–7F, the film 1010 is first formed over the flat substrate surface 112 (FIG. 10A) and is then patterned with openings 1012 for etching for the V-grooves 120 (FIG. 10B). The film 1010 hence operates as a protection mask to shied portions of the substrate 110 from being etched. Next, in FIG. 10C, the substrate 110 is etched to form the groove 120. Finally, the fibers 120 are laid and bonded to the grooves 120 to form the device as shown in FIG. 10. No longer functioning as a buffer layer between the fiber 140 and the substrate 110 for reducing stresses, this thin film 1010 may be formed of a wide range of materials including materials that may be not be suitable for the buffer layer 610.

For example, the film 1010 may be formed of a conductive material, either a heavily-doped conductive dielectric or a metallic film. The film thickness may be measured based on the sheet resistance of the film 1010. This is because the sheet resistance is inversely proportional to the thickness of the film. If the material resistivity of the film 1010 is known, the initial and final thickness values may be so determined. A four-point probe method widely used in semiconductor measurement, for example, may be used to measure the sheet resistance of the film 1010.

Figure 11:
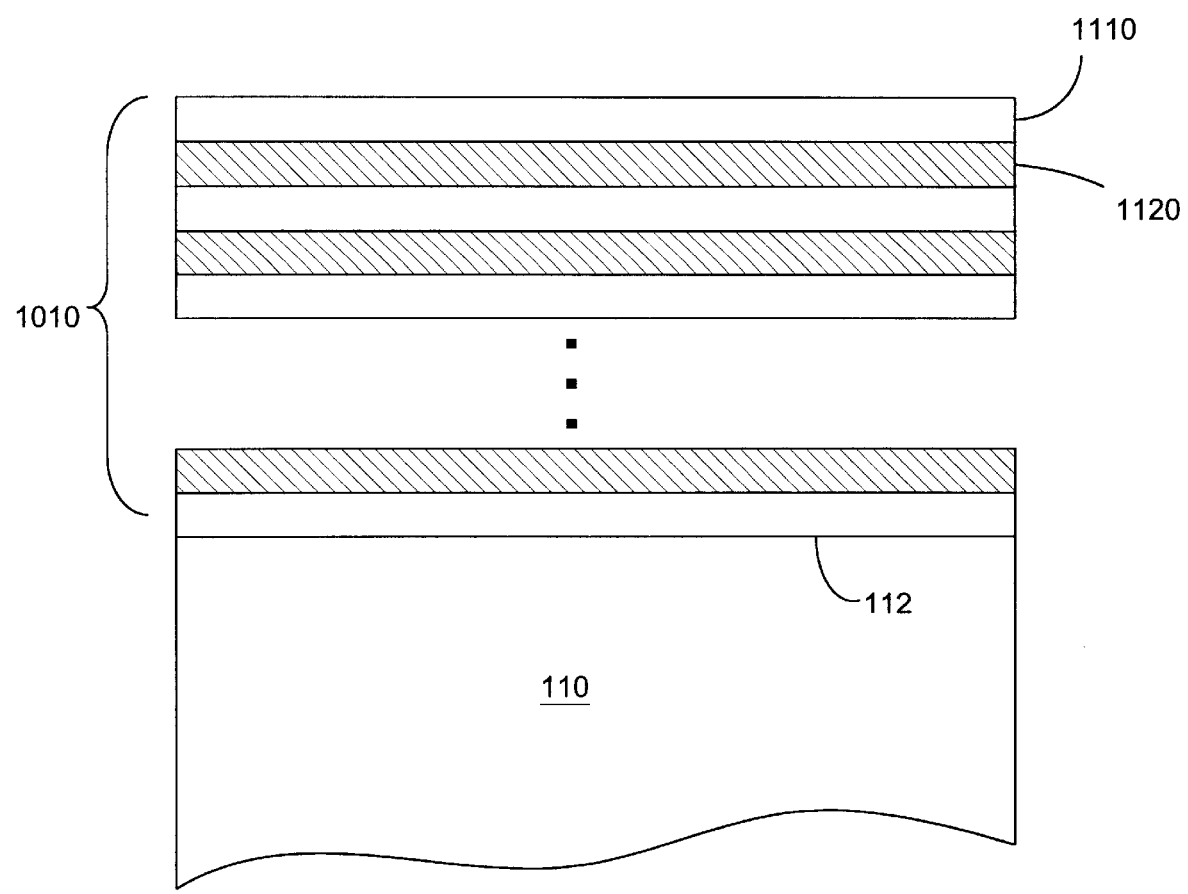
FIG. 11 shows a film stack of alternating sheet resistance values and equal thickness as the monitoring layer in FIG. 10.

FIG. 11 illustrates that the above monitoring layer 1010 may also be implemented as a stack of alternating thin films 1110 and 1120 of different sheet resistance values and equal film thickness. The total thickness of the monitoring layer 1010 is measured by the number of remaining thin films after polishing multiplied by the thickness of each film. Hence, the thickness resolution is approximately determined by the thickness of the film 1110 or 1120. The film sheet resistance may be measured by the four-point probe method. In general, the sheet resistance values of the films 1110 and 1120 are sufficiently different so that a measured sheet resistance value can be used to indicate which film, either 1110 or 1120, is being measured. In one implementation, the film 1110 may be a dielectric layer and the film 1120 may be a conductive layer. This technique can be tolerant on errors in the resistance measurements but the thickness resolution is limited to about the thickness of the film.

Only a few embodiments are disclosed. However, it is understood that variations and enhancements may be made without departing from the spirit of and are intended to be encompassed by the following claims.

What is claimed is:

1. A device, comprising:
    a substrate having a substrate surface and an elongated groove formed at a location of said substrate surface;
    a buffer layer formed to cover said elongated groove and said substrate surface; and
    a fiber laid in said elongated groove over said buffer layer and in contact with and bonded to said buffer layer,
    wherein said buffer layer is formed of a material different from said substrate and said fiber, wherein said buffer layer has a material parameter with a value that is between a first value of said material parameter for said substrate and a second value of said material parameter for said fiber.

2. The device as in claim 1, wherein said material parameter includes a coefficient of thermal expansion.

3. The device as in claim 1, wherein said fiber has a portion of fiber cladding removed to form a fiber coupling surface that is substantially coplanar with a surface of a portion of said buffer layer located over said substrate surface.

4. The device as in claim 1, wherein said substrate is formed of a crystalline material.

5. The device as in claim 4, wherein said crystalline material includes a semiconductor material.

6. The device as in claim 5, wherein said semiconductor material includes silicon.

7. The device as in claim 6, wherein said buffer layer includes silicon dioxide.

8. The device as in claim 6, wherein said buffer layer includes a silicon nitride.

9. The device as in claim 6, wherein said buffer layer includes a liquid material containing silica that solidifies when heated to a temperature.

10. The device as in claim 1, wherein said substrate includes:
    a second substrate surface opposing said substrate surface, and
    a through hole formed through said substrate to extend between said substrate surfaces and located at one end of said elongated groove,
    wherein said fiber has a portion in said elongated groove and another portion passing through said through hole to be over said second substrate surface.

11. A method, comprising:
    causing an elongated groove to be formed at a location of a substrate surface of a substrate;
    causing a buffer layer to be formed over the substrate to cover said elongated groove and said substrate surface; and
    causing a fiber to be laid in said elongated groove over said buffer layer and in contact with and bonded to said buffer layer to reduce a stress in said fiber by making a material for said buffer layer different from said substrate and said fiber, wherein said buffer layer has a coefficient of thermal expansion with a value that is between a first value for said substrate and a second value for said fiber.

12. The method as in claim 11, further comprising causing a portion of fiber cladding of said fiber to be removed to form a fiber coupling surface that is substantially coplanar with a surface of a portion of said buffer layer located over said substrate surface.

13. The method as in claim 12, further comprising causing light to be coupled via evanescent fields into or out of said fiber through said fiber coupling surface.

14. The method as in claim 11, wheren said substrate is formed of a semiconductor material.

15. The method as in claim 14, wherein said buffer layer is formed of a compound that contains said semiconductor material.

16. The method as in claim 11, further comprising:
    causing a second substrate surface opposing said substrate surface in said substrate to have a through hole to extend between said substrate surfaces and to locate at one end of said elongated groove; and
    causing a portion of said fiber to be in said elongated groove and another portion to pass through said through hole to be over said second substrate surface.

* * * * *